US006520008B1

(12) United States Patent
Stragier

(10) Patent No.: US 6,520,008 B1
(45) Date of Patent: Feb. 18, 2003

(54) HYDRAULIC MOVEMENT MEASURING SYSTEM

(75) Inventor: Marcel G. Stragier, Scottsdale, AZ (US)

(73) Assignee: Delaware Capital Formation Inc., Wilmington, DE (US)

( * ) Notice: Subject to any disclaimer, the term of this patent is extended or adjusted under 35 U.S.C. 154(b) by 0 days.

(21) Appl. No.: 09/956,288

(22) Filed: Sep. 19, 2001

Related U.S. Application Data

(60) Provisional application No. 60/233,555, filed on Sep. 19, 2000.

(51) Int. Cl.[7] .................................................. G01D 1/10
(52) U.S. Cl. .......................................... 73/168; 414/584
(58) Field of Search .................................... 73/168, 414

(56) References Cited

U.S. PATENT DOCUMENTS 2,832,488 A * 4/1958 Kamin ....................... 414/501
4,062,269 A * 12/1977 Chichester et al. ......... 187/224
4,262,643 A * 4/1981 Cavil et al. ............ 123/406.61
4,532,757 A * 8/1985 Tutle .......................... 382/110
4,783,990 A * 11/1988 Eberle et al. ................. 73/112
5,341,695 A * 8/1994 Avitan ........................ 73/1.81
5,544,474 A * 8/1996 Finkelstein .............. 56/10.2 A
5,551,824 A * 9/1996 Zanzig et al. ............... 280/420
5,895,844 A * 4/1999 Krueger ...................... 123/445

* cited by examiner

*Primary Examiner*—Hezron Williams
*Assistant Examiner*—David Rogers
(74) *Attorney, Agent, or Firm*—Parsons & Goltry; Robert A. Parsons; Michael W. Goltry

(57) ABSTRACT

A system for measuring the distance of a hydraulic movement including an engine supplying power, a hydraulic cylinder for supplying hydraulic movement, and a pump coupled to the hydraulic cylinder for providing hydraulic fluid to the hydraulic cylinder. A power take off is coupled to the engine and supplies power from the engine to the pump. A measuring device measures the amount of fluid provide to the hydraulic cylinder by counting engine revolutions enabling a determination of the distance of the movement.

21 Claims, 4 Drawing Sheets

FIG. 3
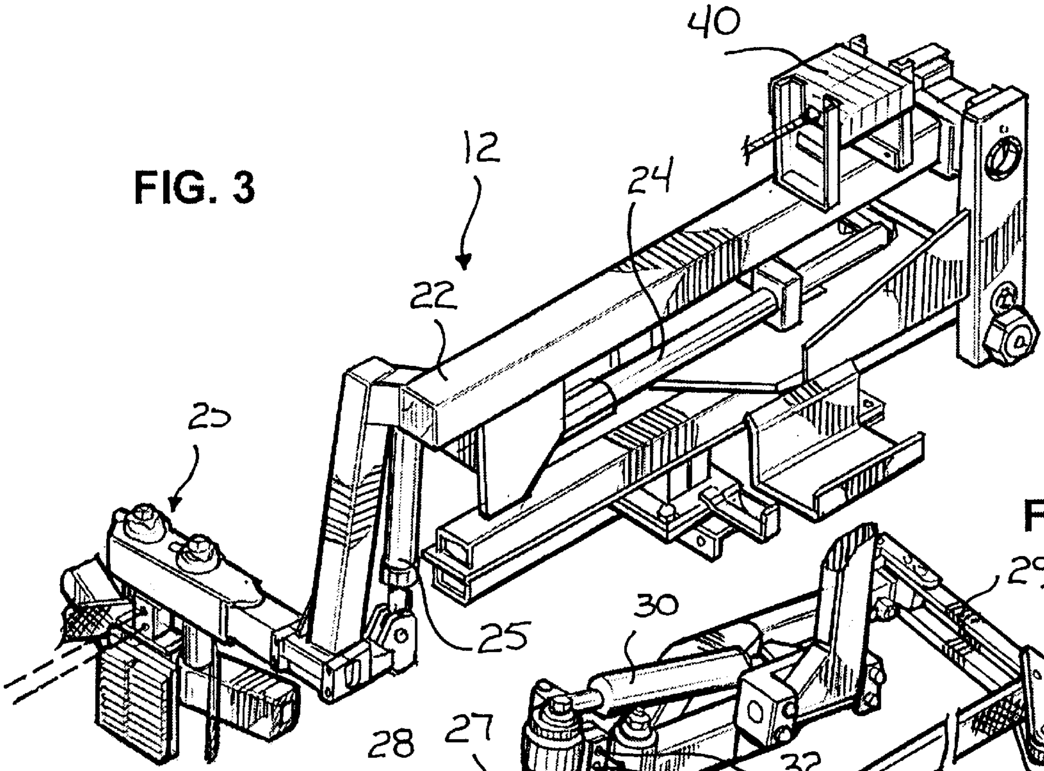
FIG. 4
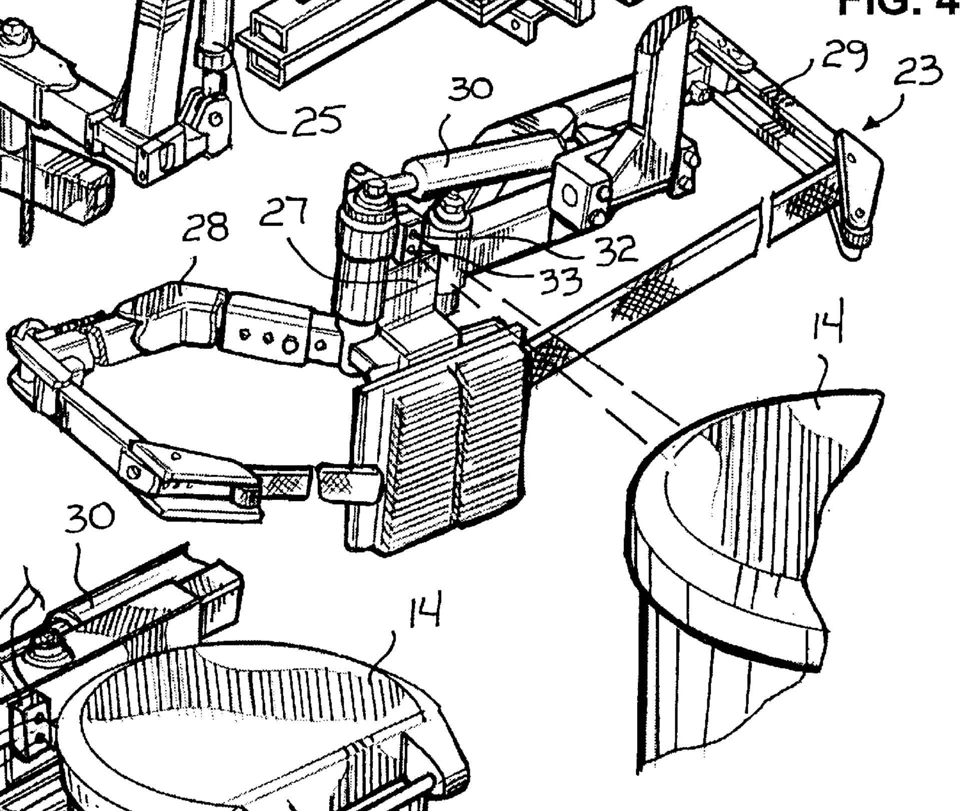
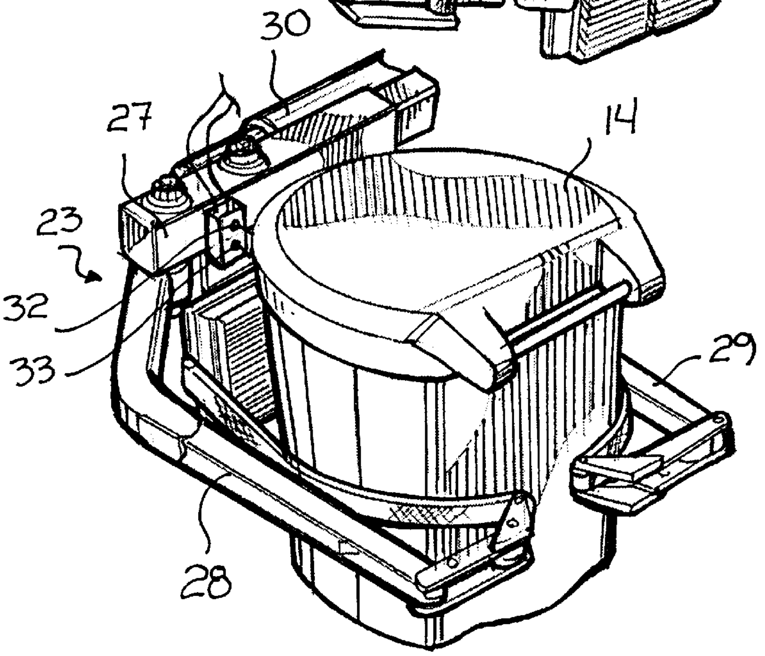
FIG. 5

HYDRAULIC MOVEMENT MEASURING SYSTEM

CROSS-REFERENCE TO RELATED APPLICATION

This application claims the benefit of U.S. Provisional Application No. 60/233,555, filed Sep. 19 2000.

FIELD OF THE INVENTION

This invention relates to hydraulic systems.

More particularly, the present invention relates to controlling hydraulic systems.

In a further and more specific aspect, the instant invention concerns control of a hydraulically operated loader mechanism.

BACKGROUND OF THE INVENTION

Hydraulic cylinders have been used to provide the motive force for mechanical articulated assemblies for many years. They are particularly useful when great force is required. When employing hydraulic cylinders there has conventionally been two ways to control hydraulic movement such as extension and retraction of the cylinder. The least complex mechanically is to simply let an operator control the cylinder and extend and retract it as necessary. While effective in very simple applications, this approach can be less than satisfactory in more complex systems having multiple articulations. Additionally, close supervision of the articulated device is not always possible. The other approach is to employ limit switches to indicate position of the articulated segments or a combination of the two approaches. Limit switches have limitations which often necessitate the combined approach. Specifically, this is the case when it is necessary to vary a motion such as to adapt to a situation. Additionally, limit switches are relatively expensive and can be a main trouble spot with frequent maintenance required.

A specific example of a complex articulated system is a loading arm for refuse collection. The systems employ hydraulic cylinders to extend and retract, pivot, dump and grip. Some of these functions do not vary, and limit switches are effective. Others, such as extending to grip a container can vary and require an observer. Loading arms typically employ an operator who must be located near the container for proper manipulation and limit switches which require high maintenance.

It would be highly advantageous, therefore, to remedy the foregoing and other deficiencies inherent in the prior art.

Accordingly, it is an object of the present invention to provide a new and improved system for measuring hydraulic movements.

Another object of the invention is to provide a new and improved system for controlling hydraulic systems.

And another object of the invention is to provide a new and improved loading mechanism for loading refuse in a refuse vehicle.

SUMMARY OF THE INVENTION

Briefly, to achieve the desired objects of the instant invention in accordance with a preferred embodiment thereof, provided is a system for measuring the distance of a hydraulic movement. The system includes an engine supplying power, a hydraulic cylinder for supplying hydraulic movement, and a pump coupled to the hydraulic cylinder for providing hydraulic fluid to the hydraulic cylinder. A power take off is coupled to the engine and supplies power from the engine to the pump. A measuring device measures the amount of fluid provided to the hydraulic cylinder by counting engine revolutions.

Also provided is a method of operating a mechanized refuse collection vehicle including providing a refuse collection vehicle having an engine supplying power, an extendable arm moveable between an extended position and a retracted position by a hydraulic cylinder, the hydraulic cylinder providing an extension movement of the extendable arm toward the extended position and a retraction movement of the extendable arm toward the retracted position, a gripping mechanism coupled to the extendable arm and movable between an open configuration and a gripping configuration, and a pump coupled to the hydraulic cylinder for providing hydraulic fluid to the hydraulic cylinder and driven by the engine. A control system is provided including a computational device and a first control and a second control. The computational device measures the amount of fluid provide to the hydraulic cylinder by counting revolutions of the engine. The first control is actuated to accomplish a discharge cycle including extending the extendable arm in an extension movement, ending the extension movement of the extendable arm and ending counting by the computational device. The computational device factors the total count to determine the distance of the movement. The cycle continues by gripping a container, retracting the extendable arm to the retracted position and moving the gripping mechanism into a dumping orientation over the vehicle. The second control is actuated to accomplish a return cycle including lowering the extendable arm, recreating the extension movement by actuating the hydraulic cylinder and counting the engine revolutions, comparing the count to the stored count, and ending the movement when the counts match.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which:

FIG. 3 is a partial perspective view of the loader mechanism of the collection vehicle of FIGS. 1 and 2;

FIG. 4 is a perspective view of a gripping mechanism of the loader mechanism as it appears in an open configuration approaching a refuse container;

FIG. 5 is a perspective view of the gripping mechanism of as it would appear gripping the refuse container.

DETAILED DESCRIPTION OF THE PREFERRED EMBODIMENT

Figure 1:
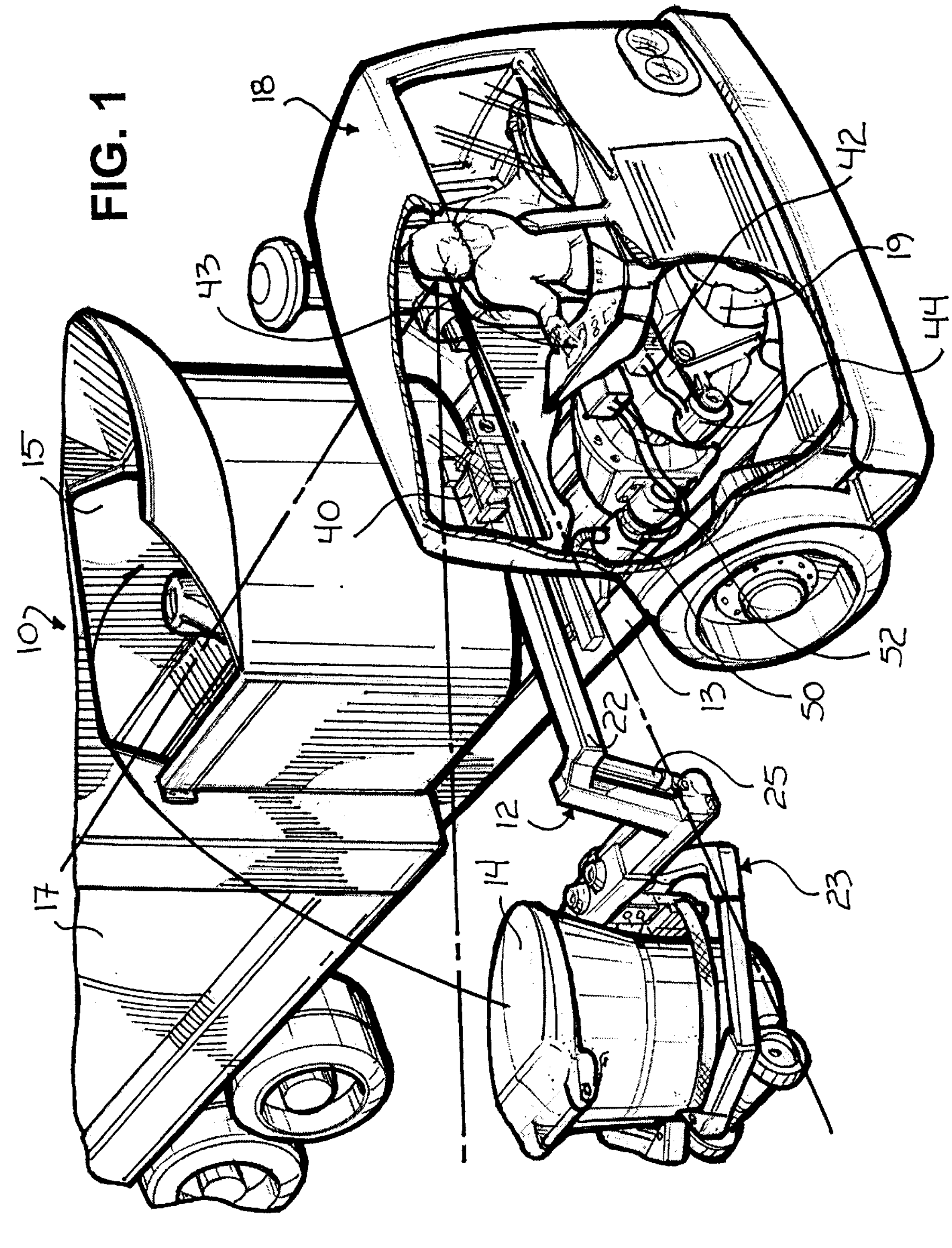
FIG. 1 is a partial perspective view illustrating a refuse collection vehicle according to the present invention with portions of the cab cut-away.

Turning now to the drawings in which like reference characters indicate corresponding elements throughout the several views, attention is first directed to FIG. 1 which illustrates a refuse collection vehicle 10. A conventional loader mechanism 12 is mounted on a frame 13 of refuse collection vehicle 10. Loader mechanism 12 is illustrated engaging a refuse container 14 which will be hoisted and dumped into a hopper 15 as will be described presently. The refuse will then be compressed into a storage body 17 located rearward of hopper 15. A cab 18 is positioned forward of loader mechanism 12, and contains controls for the operation of vehicle 10 and loader mechanism 12. Vehicle 10 is powered by a conventional engine 19 such as an internal combustion engine.

Figure 2:
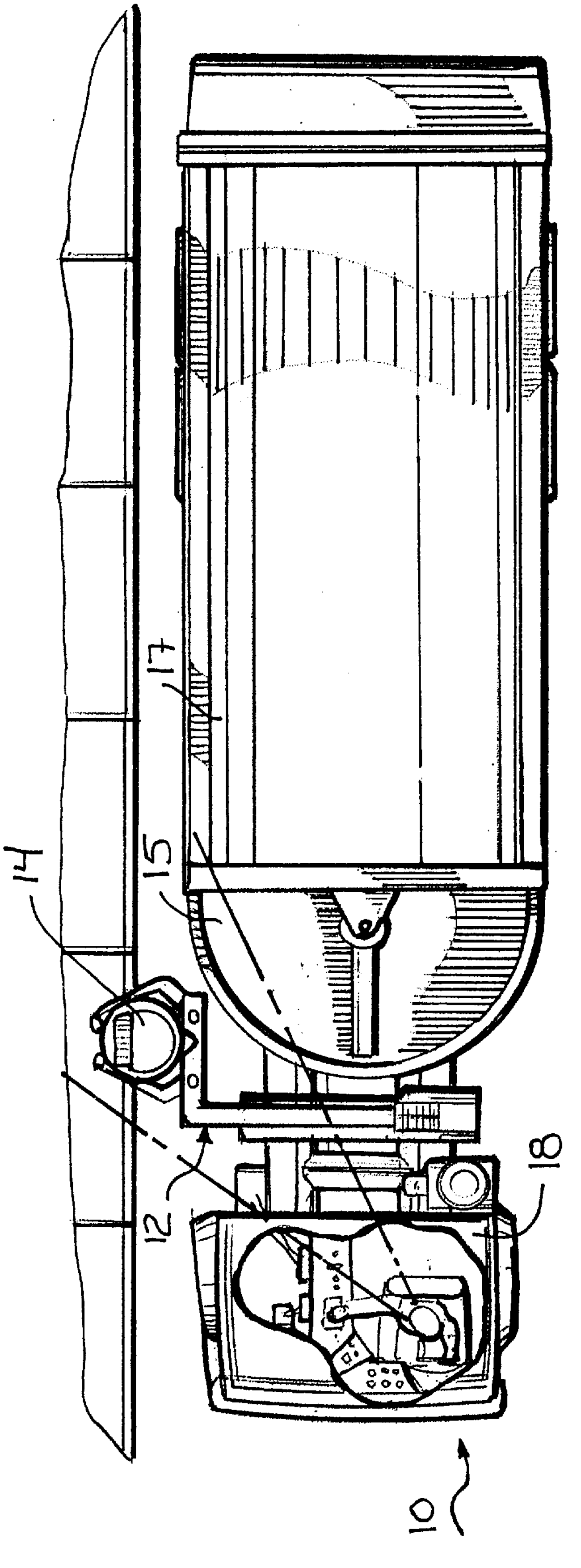
FIG. 2 is a top plan view of the refuse collection vehicle of FIG. 1.

The following description describes a system for operating mechanized refuse collection equipment in which the operator actuates two controls to complete a loading cycle. A control system having logic circuitry, various sensors and a hydraulic movement measuring system enable a two control loading cycle. The system applies to most loading equipment for side loaders with which the operator uses hydraulically operated and electrically controlled equipment to collect household refuse. The operator uses electrical switches within cab 18 to actuate loading mechanism 12 remotely to pick up containers beside collection vehicle 10. The system enables an operator to observe container 14 from within cab 18 of vehicle 10 and operate the collection sequence as can be seen with reference to FIG. 2.

Still referring to FIG. 1, with additional reference to FIG. 3, loading mechanism 12 includes an arm 22 and a gripping mechanism 23. Arm 22 is movable between a retracted position and an extended position by a hydraulic cylinder 24. Gripping mechanism 23 is pivotally coupled to an end of arm 22 and pivoted by a dump hydraulic cylinder 25. Gripping mechanism 23 can be substantially any conventional gripping mechanism. With reference to FIG. 4, in this embodiment gripping mechanism 23 includes a base 27 from which a pair of opposing gripping arms 28 and 29 pivotally extends. Arms 28 and 29 are moved between an open position (FIG. 4) and a gripping position (FIG. 5) by a hydraulic cylinder 30.

Turning to FIGS. 4 and 5, a measuring system is employed to actuate cylinder 30 and begin moving gripping mechanism 23 from the open position to the gripping position. The measuring system includes a pair of proximity sensors 32 and 33 mounted on base 27 of gripping mechanism 23 whose purpose is to sense the proximity of container 14. These measuring devices can include both infrared and ultrasonic devices. At a pre-set distance, such as eighteen inches in this embodiment, sensor 32 detects a container and initiates the gripping action of gripping mechanism 23. The pre-set distance is a function of the speed with which gripping mechanism 23 moves from the open position to the closed position. When sensor 33 detects the container, it is at the correct position to stop extension of arm 22, in this embodiment, approximately three inches. Upon detection, sensor 33 sends a signal which terminates the extension of arm 22.

With the loader no longer extending, gripping arms 28 and 29 engage the container. As gripping arms 28 and 29 engage the container, hydraulic pressure builds up in gripping actuation cylinder 30. This pressure is sensed by a pressure switch which switches the logic circuit from gripping movement to hoisting movement, in the conventional way. Further, also according to the previous convention, the hoisting circuit actuates the circuits that operate and control to retract the loader and to dump the container. The control system initiates these functions through operation of a valve assembly 40 as shown in FIGS. 1 and 3. Valves 40 control operation of individual hydraulic cylinders by permitting or preventing fluid flow thereto. Thus, fluid flows to cylinder 24 to extend arm 22 until the valve is closed upon the control system receiving a signal from sensor 33. Cylinder 30 continues to close gripping arms 28 and 29 about container 14 until the pressure sensor, located at or proximate the appropriate valve, signals that a pre-set pressure has been achieved.

As briefly mentioned previously, the control system additionally includes a hydraulic movement measuring system. Hydraulic movement, in this specific embodiment includes the extension or retraction of a hydraulic cylinder. A counter is actuated to count the revolutions of engine 19 as arm 22 moves out toward the container. This is accomplished by counting pulses from an alternator 44. When arm 22 stops, the counter stops. A computational device 42, containing the counter in this embodiment, factors the resultant count and stores the answer. It should be understood that various other methods of counting engine revolutions may be employed, such as using a tachometer, etc. The stored data can then be employed to match the hydraulic movement. When retracted during the dumping process, arm 22 can be re-extended the same distance by again counting engine revolutions and comparing the count against the stored data. When the counts match the extension is terminated at the same spot.

Hydraulic fluid is provided to valve assembly 40 by a pump 50. Pump 50 is driven by engine 19 through a power take off 52. It should be noted that the system works because the hydraulic control valves are in series and the pump is a fixed displacement pump. That is to say that the pump forces a fixed quantity (about 2 cubic inches) of oil into the system during each revolution. Thus, since pump 50, alternator 44 and engine 19 revolution rate are all directly proportional (within reasonable tolerance for belt, clutch slippage, minor hydraulic leakage), measuring engine turns allows the system to make a reasonable estimate of the location of the piston in the hydraulic cylinder and, therefore, the location of the device it is actuating.

In combination with other equipment on the vehicle, the effect is to enable the operator to empty a container using only two controls 43. The first control is actuated after aligning the vehicle with the container. Upon actuation of the first control, arm 22 is extended as previously described. The operator simply holds the control down and the loading sequence is continued to completion. When the container has been discharged, the operator actuates the second control to lower the container and return it to its original location. When loader mechanism 12 is operated to lower the container, the computational device actuates the out control to move the loader back to the position it was in when the container was engaged, returning the container to its original position beside the vehicle. The second control is released when the gripping arms are retracted and ready for the vehicle to move to the next container.

Figures 6A, 6B, 6C, 6D, 6E, 6F, 6G, 6H:
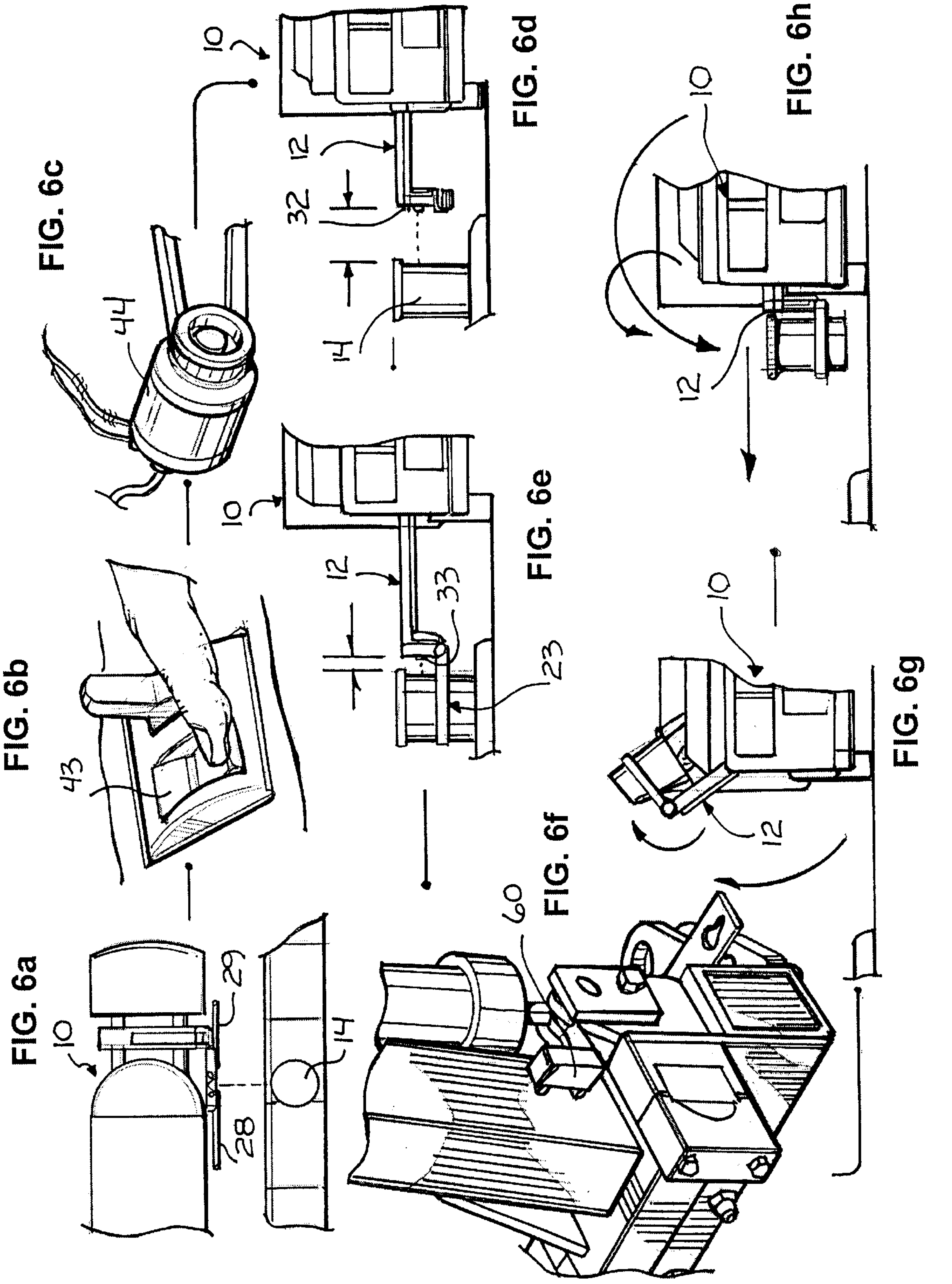
FIGS. 6*a*–6*h* illustrate a refuse collection sequence.

Turning now to FIGS. 6*a*–6*g*, a loading cycle is illustrated. Referring to FIG. 6*a*, the operator drives vehicle 10 to a position to align gripping arms 28 and 29 with the refuse container to be collected. A control 43 (FIG. 6*b*), which in this embodiment is a rocker switch, is operated to extend loader 12 toward the container. While loader 12 extends, computational device 42 records the number of engine revolutions. This can be accomplished in numerous ways. In the preferred embodiment, computational device 42 receives a pulsing signal from alternator 44 of vehicle 10. The pulses from alternator 44 correspond to revolutions of engine 19 (FIG. 6*c*).

When loader 12 has extended to a position a set distance away from the container, about 18" in practice (FIG. 6*d*), computational device 42 receives a signal from proximity sensor 32 mounted on base 27 of gripping mechanism 23. The signal from sensor 32 actuates the control which begins closing gripping arms 28 and 29 by opening the valve supplying fluid to cylinder 30. As gripping arms 28 and 29 close, arm 22 continues to extend toward the container. When loader 12 has extended to a position a pre-set distance away from the container, about 3" in practice (FIG. 6*e*), computational device 42 receives a signal from second proximity sensor 33 mounted with sensor 32 and actuated by the container. These distance measuring devices or proximity sensors can include both infrared and ultrasonic devices. Either work satisfactorily. At the second signal, computational device 42 stops counting engine turns, factors the total and stores the result for later use.

The operator continues to hold the out control. If he releases it, the operation stops. If he re-engages it, the operation continues. With the loader no longer extending, gripping arms 28 and 29 engages the container. The hydraulic pressure built up in gripping actuation cylinder 30 is sensed and the circuit is changed from a gripping movement to a hoisting movement, in the conventional way. Further, also according to previous convention, the hoisting circuit actuates the circuits which retract the loader and dump the container (FIG. 6*g*).

The operator observes the container discharge. He may shake the container by using the two controls. When he is satisfied that the container is empty, he operates the second control. The container begins to retract from dumping. According to the previous convention, a timer actuates the control to lower the hoist after a short (¼ second) delay. The container continues to retract from dumping while it lowers. When it is completely retracted, a limit switch 60 (see FIG. 6*f*) opens the circuit. The lowering motion continues. The second control also signals computational device 42 to actuate the circuit to extend the loader. The device again counts engine revolutions until it reaches the factored, sorted number at which point it disengages the circuit (FIG. 6*h*).

When the container has been lowered by the loader arm to a position near the ground and near the end of the actuating cylinder stroke, a limit switch is tripped which switches the circuit from lowering the container to releasing it. The operator continues to hold the second control, with the circuitry now engaged to open the gripping arms. Next, according to the previous convention, after a short delay (¼ second) to allow the arms to clear the container, the signal to retract the loader is added and the grip arms release while the loader retracts until both reach their stowed positions. With the container dumping cycle complete, the operator moves the truck to next container. The system permits the regular and efficient operation of the loader using two controls and two actuations, whereas the conventional system required five.

It is apparent that the application described is only one of many where a simple, relatively inexpensive method of measuring the location of a hydraulically driven device will be useful.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same,

The invention claimed is:

1. A system for measuring the distance of a hydraulic movement of a hydraulic cylinder based on the quantity of hydraulic fluid displaced to move the cylinder, the system comprising:

an engine supplying power;

a hydraulic cylinder for supplying hydraulic movement;

a pump coupled to the hydraulic cylinder for providing hydraulic fluid to the hydraulic cylinder and driven by the engine; and a measuring device, comprising an apparatus for counting the revolutions of the engine, that factors the count to determine the amount of hydraulic fluid pumped to the cylinder.

2. A system as claimed in claim 1 wherein the apparatus for counting includes an alternator coupled to the engine and a computational device coupled to the alternator, the alternator generating a pulsing signal with the pulses generally corresponding to engine revolutions and the computational device counting the pulses.

3. A system as claimed in claim 2 further including an end movement sensor which senses the end of the hydraulic movement and sends a signal to the computational device to end counting, the computational device factors the total count to determine the distance of the movement.

4. A system as claimed in claim 3 wherein the end movement sensor includes a proximity sensor.

5. A system as claimed in claim 1 further including a power take off coupled to the engine and supplying power from the engine to the pump.

6. A system as claimed in claim 1 wherein the pump is a fixed displacement pump.

7. A system for measuring the distance of a hydraulic movement, the system comprising:

a vehicle powered by an engine;

a hydraulic cylinder moveable between an extended position and a retracted position;

a pump coupled to the hydraulic cylinder for providing hydraulic fluid to the hydraulic cylinder;

a power take off coupled to the engine and supplying power from the engine to the pump;

a measuring device for counting revolutions of the engine; and a computational device for factoring the revolutions to determine a distance of extension of the hydraulic cylinder.

8. A system as claimed in claim 7 further including an alternator coupled to the engine, the alternator generating a pulsing signal with the pulses generally corresponding to engine revolutions and the computational device counting the pulses.

9. A system as claimed in claim 7 further including an end movement sensor which senses the end of the hydraulic movement and sends a signal to the computational device to end counting, the computational device factors the total count to determine the distance of the movement.

10. A system as claimed in claim 9 wherein the end movement sensor includes a proximity sensor.

11. A system as claimed in claim 9 further including a loader mechanism coupled to the vehicle and extendable by the hydraulic cylinder for grasping an item, the distance of extension variably measured by the computational device.

12. A system as claimed in claim 7 further comprising:

an extendable arm moveable between an extended position and a retracted position by the hydraulic cylinder, the hydraulic cylinder providing an extension movement of the extendable arm toward the extended position and a retraction movement of the extendable arm toward the retracted position;

a gripping mechanism coupled to the extendable arm and movable between an open configuration and a gripping configuration;

a first proximity sensor mounted on the gripping mechanism for initiating movement of the gripping mechanism from the open configuration to the closed configuration; and a second proximity sensor mounted on the gripping mechanism to end the extension movement of the extendable arm and sends a signal to the computational device to end counting, the computational device factors the total count to determine the distance of the movement.

13. A system as claimed in claim 12 further including a control system comprising:

a first control for actuation of a discharge cycle including extending the extendable arm until signaled by the second proximity sensor, gripping a container initiated by the first proximity sensor, retraction of the extendable arm to the retracted position and movement of the gripping mechanism into a dumping orientation over the vehicle; and a second control for actuating a return cycle including lowering the extendable arm, recreating the extension movement by actuating the hydraulic cylinder and counting the engine revolutions, comparing the count to the stored count, and ending the movement when the counts match.

14. A method of measuring hydraulic movement comprising the steps of:

providing an engine supplying power;

providing a hydraulic cylinder for supplying hydraulic movement;

providing a pump coupled to the hydraulic cylinder for providing hydraulic fluid to the hydraulic cylinder;

driving the pump with the engine;

actuating hydraulic movement from the hydraulic cylinder; and measuring the amount of fluid provide to the hydraulic cylinder to determine the distance of the movement, by counting the revolutions of the engine.

15. A method as claimed in claim 14 further including the step of stopping counting the engine revolutions at the end of the hydraulic movement.

16. A method as claimed in claim 15 further including the step of factoring and storing the count.

17. A method as claimed in claim 16 further including recreating the movement by actuating the hydraulic movement and counting the engine revolutions, comparing the count to the stored count, and ending the movement when the counts match.

18. A method of operating a mechanized refuse collection vehicle comprising:

providing a refuse collection vehicle including an engine supplying power, an extendable arm moveable between an extended position and a retracted position by a hydraulic cylinder, the hydraulic cylinder providing an extension movement of the extendable arm toward the extended position and a retraction movement of the extendable arm toward the retracted position, a gripping mechanism coupled to the extendable arm and movable between an open configuration and a gripping configuration, and a pump coupled to the hydraulic cylinder for providing hydraulic fluid to the hydraulic cylinder and driven by the engine;

providing a control system including a computational device for measuring the amount of fluid provide to the hydraulic cylinder by counting revolutions of the engine and a first control and a second control;

actuating the first control to accomplish a discharge cycle including extending the extendable arm in an extension movement, ending the extension movement of the extendable arm and ending counting by the computational device, the computational device factoring the total count to determine the distance of the movement, gripping a container, retracting the extendable arm to the retracted position and moving the gripping mechanism into a dumping orientation over the vehicle; and actuating the second control to accomplish a return cycle including lowering the extendable arm, recreating the extension movement by actuating the hydraulic cylinder and counting the engine revolutions, comparing the count to the stored count, and ending the movement when the counts match.

19. A method as claimed in claim 18 wherein the step of counting revolutions of the engine includes providing an alternator coupled to the engine and counting the pulses generated by the alternator.

20. A method as claimed in claim 18 wherein the steps of ending the extension movement of the extendable arm and ending counting by the computational device includes the steps of providing a proximity sensor mounted on the gripping mechanism, sending a signal to the control system to end the extension movement of the extendable arm and to the computational device to end counting, the computational device factors the total count to determine the distance of the movement.

21. A method as claimed in claim 20 wherein the step of gripping a container includes the steps of providing another proximity sensor mounted on the gripping mechanism for initiating movement of the gripping mechanism from the open configuration to the closed configuration.

* * * * *